United States Patent
Haines et al.

(10) Patent No.: US 6,233,409 B1
(45) Date of Patent: May 15, 2001

(54) REDUNDANT REORDER PREVENTION FOR REPLACEABLE PRINTER COMPONENTS

(75) Inventors: Robert E. Haines; Mary B. Baumunk, both of Boise; Darius Boockholdt, Eagle, all of ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/480,545

(22) Filed: Jan. 10, 2000

Related U.S. Application Data

(63) Continuation-in-part of application No. 09/410,989, filed on Oct. 1, 1999.

(51) Int. Cl.[7] .................................................. G03G 21/00
(52) U.S. Cl. ................................................. 399/10; 399/8
(58) Field of Search ..................................... 399/10, 8, 81, 399/24, 79; 364/184

(56) References Cited

U.S. PATENT DOCUMENTS

| | | | |
|---|---|---|---|
| 5,873,009 | * | 2/1999 | Yamashita et al. ................... 399/8 |
| 6,023,593 | * | 2/2000 | Tomidokoro ........................... 399/8 |

* cited by examiner

Primary Examiner—Richard Moses

(57) ABSTRACT

A redundant reorder prevention system prevents redundant reorders for replaceable components in printing devices. The replaceable component has memory integrated therein which contains a reorder value field. The reorder value field is initially configured in a first state which indicates that a new replaceable component has not been ordered to replace the current replaceable component. Before the system orders a new replaceable component, it checks the reorder value field. If the first state is detected, a new replaceable component is ordered and the reorder value field is reconfigured to a second state which indicates that the new replaceable component has been ordered. If the second state is detected before an order is placed, the order process is terminated before a new replaceable component is ordered.

18 Claims, 4 Drawing Sheets

REDUNDANT REORDER PREVENTION FOR REPLACEABLE PRINTER COMPONENTS

CROSS REFERENCE TO RELATED APPLICATIONS

This application is a continuation in part of co-pending U.S. application Ser. No. 09/410,989 filed Oct. 1, 1999.

TECHNICAL FIELD

This invention generally relates to replaceable components installable into printing devices, and more particularly, to printing device components having a memory.

BACKGROUND

Most types of printing devices are equipped with replaceable components that have a life cycle during which the replaceable components are functional. At the end of the life cycle of a replaceable component, the component must be replaced for the printing device to continue to function properly. Typically, a new replaceable component is ordered from a vendor to replace the component currently being used.

For example, a toner cartridge is installed in a laser printer to provide toner for the printing process. As documents are printed, the toner supply is gradually depleted. When the toner supply is completely exhausted, the printer cannot print any further documents until the toner cartridge is replaced. At this time, a replacement toner cartridge must be ordered from a toner cartridge vendor to replace the used toner cartridge.

A printer user has many toner cartridge vendors from which to choose when purchasing a toner cartridge to replace a depleted toner cartridge. Not only can the user purchase a toner cartridge from the printer manufacturer or an authorized reseller, but there are toner cartridges available from many vendors who remanufacture toner cartridges. Toner cartridges are remanufactured by taking a depleted toner cartridge and restoring it by replenishing the toner supply and replacing some deteriorated parts.

Because of the competitive nature of the market for toner cartridges, manufacturers, resellers and remanufacturers seek any opportunity to reach printer users with advertisements for their products and services. Many advertising avenues are used by vendors to advertise to potential customers. Vendors place advertisements in catalogues, magazines, trade journals, etc. Unfortunately, these conventional advertising avenues only reach a percentage of the target audience. In addition, the advertisements may be included with similar advertisements by competitors which diminishes the effect of the advertisement.

SUMMARY

A printing system provides a redundant reorder prevention function by indicating when a new component has been ordered to replace a replaceable component currently in use by the system. Before the new component is ordered, the system checks for an indication as to whether such a component has already been ordered.

If the system indicates that the new component has already been ordered, the system does not order another component. If the system indicates that a new component has not been previously ordered, a replaceable component is ordered and an indication is made that the replaceable component has been ordered so that a redundant order will not be subsequently placed.

Toner cartridges and other replaceable printer components are made which have memory placed on the cartridge itself or within the label affixed to the cartridge. This memory is used to store printer-related data that the printer reads to determine various printing parameters. For example, the memory may store the model number of the cartridge so that the printer may recognize the cartridge as valid or invalid for use with that printer.

This memory may also be utilized by a vendor to store the vendor's telephone number or Universal Resource Locator (URL) so the vendor can be automatically contacted by the user. This is not only a convenience for the user, but it provides the original vendor with an excellent opportunity to market subsequent toner cartridges to the user. This arrangement may be utilized in an automatic reorder system.

In one implementation, the memory has a field that is originally set to one value to indicate that a new component has not yet been ordered. When the new component is ordered, the field in the memory of the replaceable component is set to a second value to indicate that the new replaceable component has been ordered. If a subsequent event invokes the order system to order another component to replace the replaceable component in use, the order system first checks the memory field. If the field contains the first value, a new component is ordered and the field content is changed to the second value. If the field contains the second value when it is checked, no order is made.

In another implementation, the memory stores a component identifier. A system reads the component identifier when an order is made for a new component and compares the component identifier with a component identifier lookup table in memory resident within a host computer connected to the printing device or in a vendor system. If the component identifier is not found in the component identifier lookup table, a new component is ordered. If, however, the component identifier is found, a new component has already been ordered to replace the replaceable component currently in use, and no order is placed for a new replaceable component.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

One solution that has been proposed to solve the problem of retaining toner cartridge customers through direct advertising is to provide a printing system that has an automatic order functionality which automatically orders a new cartridge from the vendor who sold the cartridge currently in use to the user. One example of such a system is disclosed in U.S. patent application Ser. No. 09/480,536, Attorney Docket 10991708, filed concurrently herewith, entitled "Printing Device Replaceable Components With Automatic Order Functionality."

In such a system, when the toner supply in a toner cartridge reaches a pre-defined or user-defined level that indicates a replacement toner cartridge should be ordered, the system automatically contacts a toner cartridge vendor, and provides ordering information to the toner cartridge vendor so that a replacement toner cartridge is shipped to the printer user. The user is thereby assured that a functional toner cartridge will be on hand when the current toner cartridge is depleted.

However, a problem arises when the toner level used to trigger a cartridge order is detected more than once for a cartridge. For example, suppose a printer orders a new cartridge when the toner depletes to a certain level. It is well known that the life of a toner cartridge can be extended after a toner low signal appears by temporarily removing the toner cartridge and shaking the toner cartridge to dislodge amounts of toner that have accumulated in inner crevices of the toner cartridge. If the newly loosened toner is sufficient to reset the toner low detector, then the toner low signal disappears when the toner cartridge is reinstalled. The toner low signal will reappear when the toner is once again significantly depleted, thus triggering the automatic order function to order a second replacement cartridge—which is not required nor intended by the user. The present invention overcomes this problem.

Figure 1:
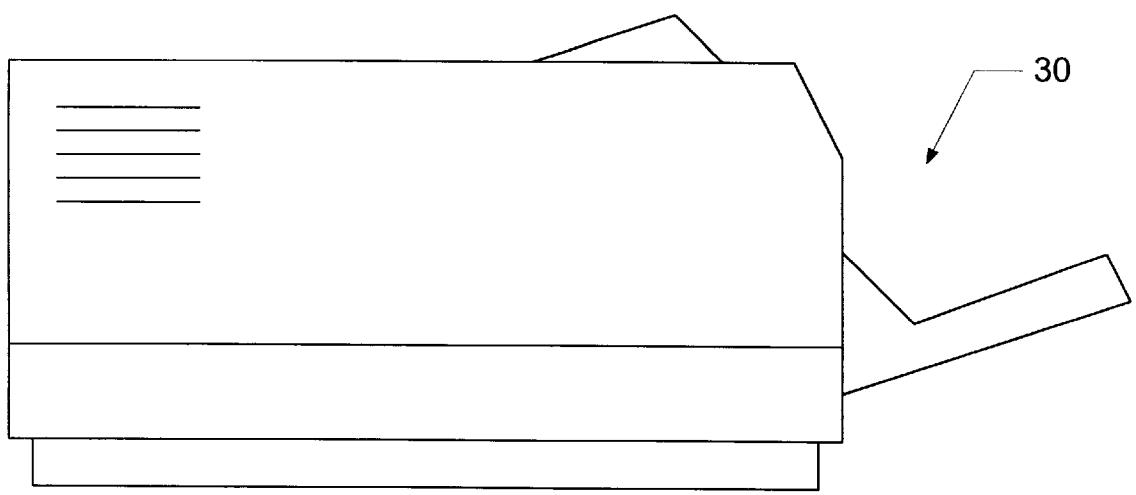
FIG. 1 is a diagrammatic illustration of a laser printer.

FIG. 1 is a diagrammatic illustration of a laser printer 30 in which the present invention may be implemented. The invention may further be implemented in other units that employ printing devices, such as scanners, photocopiers, facsimile machines, and the like. For purposes of discussion, the invention is described in the context of laser printers.

Figure 2:
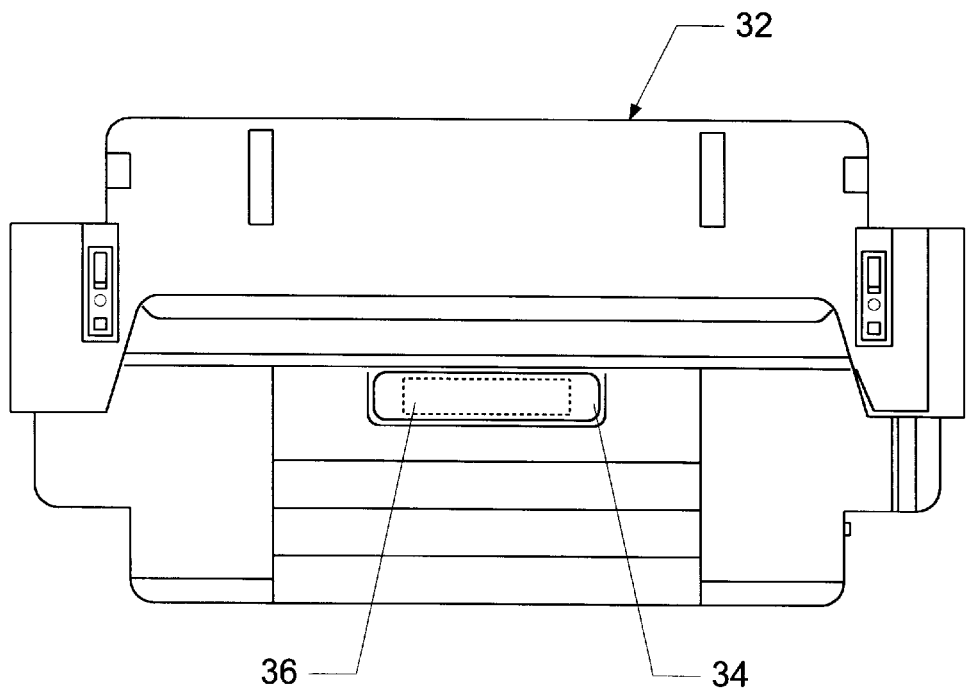
FIG. 2 is a diagrammatic illustration of a laser printer toner cartridge.

FIG. 2 shows a toner cartridge 32 that is installable in the laser printer 30. The toner cartridge 32 has a label 34 that contains information identifying the toner cartridge 32 to a user. The label 34 typically recites the name of the manufacturer, the model number of the cartridge, etc. Although the invention is shown and described herein embodied as a printer toner cartridge for a laser printer, it is noted that the invention may be embodied as any replaceable component (toner cartridge, ink cartridge, fuser, drum, etc.) installable in a printing device (printer, copier, fax machine, etc.).

A memory tag 36 is located underneath the label 34 on the toner cartridge 32, although the memory tag 36 may be placed on the toner cartridge 32 at any location which may be practical for the purposes described herein. The memory tag 36 is preferably a radio frequency identification (RFID) memory tag. RFID memory tags and applications therefor are well known in the art. Further aspects of the RFID memory tag 36 structure and its functionality in the present invention will become more clear as the discussion progresses.

Figure 3:
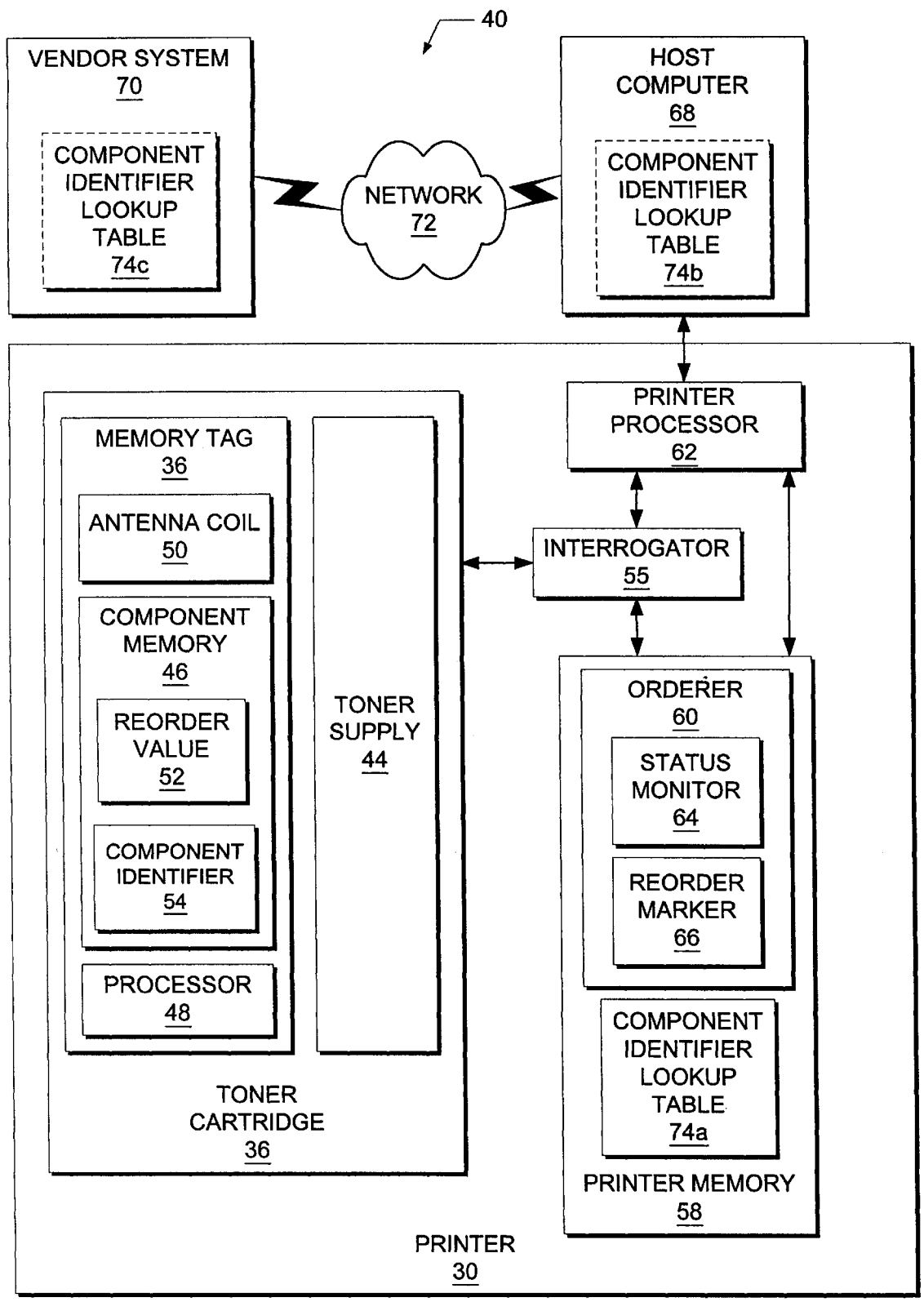
FIG. 3 is a block diagram of a printing system.

FIG. 3 is a block diagram of printing system 40 that includes the printer 30 with the toner cartridge 32 installed therein. The toner cartridge 32 may be removed and replaced by another toner cartridge (not shown).

The toner cartridge 32 includes the memory tag 36 and a toner supply 44. As previously stated, the memory tag 36 is an RFID memory tag, although it is noted that the memory tag 36 may be conventional semiconductor memory. The RFID memory tag 36 has component memory 46, a processor 48, and an antenna coil 50. The component memory 46 has a reorder value 52 and a component identifier 54 stored therein. It is noted, however, that the present invention may be implemented using either the reorder value 52 or the component identifier 54, i.e., it is not necessary to utilize both simultaneously. The reorder value 52 is initially configured to a first state which indicates that a new toner cartridge has not been ordered to replace the toner cartridge 32. The component identifier 54 may be any data which uniquely identifies the toner cartridge 32, such as a toner cartridge serial number.

The RFID memory tag 36 is designed to operate in conjunction with an interrogating device, also known as an interrogator. An interrogator is a device that provides power to, reads from and/or writes to the memory tag 36. Examples of interrogators include a memory tag reader or scanner, a memory tag writing device which stores data on the memory tag 36, and the like. In the present example, the laser printer 30 includes an interrogator 55.

The interrogator 55 emits a radio frequency field that provides power to the memory tag 36 via the antenna coil 50. The memory tag 36, therefore, does not require its own power supply, a feature that adds to the cost efficiency and practicality of utilizing RFID memory for the memory tag 36.

Communications between the interrogator 55 and the RFID memory tag 36 are transmitted and received via the radio frequency field and the antenna coil 50 utilizing standard RFID method and protocol, as promulgated in ISO 14443 and ISO 15693. Therefore, physical contact between the memory tag 36 and the printer 30 is not required for the printer 30 to communicate with the memory tag 36.

The printer 30 includes a printer memory 58. An orderer 60 resides in the printer memory 58 and executes an automatic order process on a printer processor 62. The orderer 60 includes a status monitor 64 and a reorder marker 66. The status monitor 64 is configured to continuously monitor the toner cartridge 32 and to notify the orderer 60 when a trigger event occurs that indicates that a new toner cartridge should be ordered to replace the existing toner cartridge 32.

When a new toner cartridge is ordered, the reorder marker 66 is configured to change the reorder value 52 in the cartridge memory 48 from a first state, which indicates that a new toner cartridge has not been ordered, to a second state which indicates that the new toner cartridge has been ordered.

A host computer 68 is connected to the printer 30 and communicates with a vendor system 70 via a network 72 to order items from a vendor. The network 72 may be a local area access network (LAN), a wide area access network (WAN), the Internet, or any other configuration through which at least two computer systems may communicate.

A component identifier lookup table 74a is located in the printer memory 58. Every component has a unique component identifier, such as a serial number. When a new component is ordered to replace a component, the serial number of the component is stored in the component identifier lookup table 74a. When the system detects a signal that a new component should be ordered, the system checks to determine whether the serial number of the component to be replaced is in the component identifier lookup table 74a. If it is, the new component has already been ordered and the order process is terminated. Although the component identifier table 74a is shown in the printer memory 58, it will become evident as this discussion progresses that the component identifier lookup table 74b may be located in the host computer 68 or the component identifier lookup table 74c may be located in the vendor system 70.

It is also noted that although the functional components of the automatic order system are shown in specific locations, the functional components may be located on the printer 30 or the toner cartridge 32 provided the functionality of the system is preserved.

Figure 4:
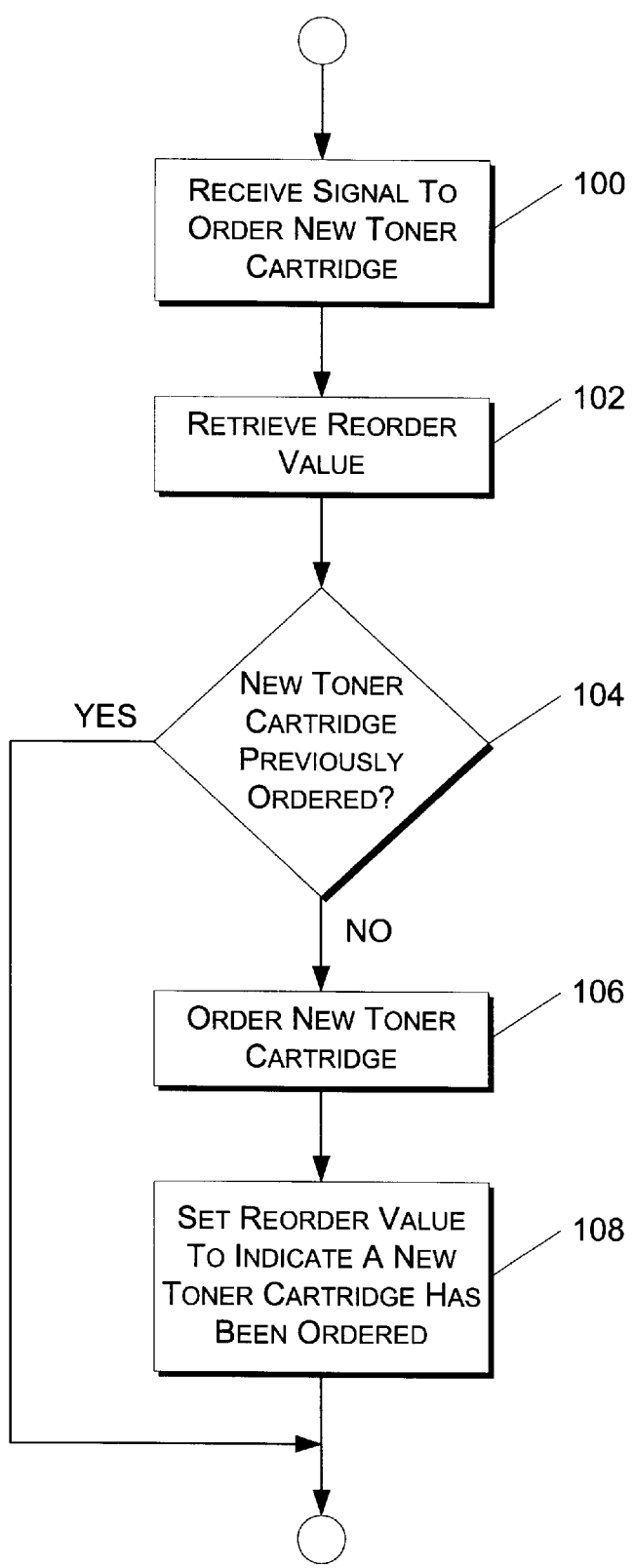
FIG. 4 is a flow diagram of a redundant reorder prevention process for replaceable printer components utilizing a reorder value.

FIG. 4 depicts a redundant reorder prevention process. These steps are performed in software and will be described with reference to FIG. 3. At step 100, the status monitor 64 monitors the toner cartridge 32 and receives a trigger event which indicates that the orderer should initiate a process to order a new toner cartridge. The trigger event may be a pre-defined event, such as the occurrence of a toner low signal for the toner cartridge 32. The trigger event may also be a user-defined event, such as when the user initially installs the toner cartridge 32 into the printer 30.

At step 102, the reorder value 52 is retrieved from the toner cartridge 32 by the printer 30. At step 104, the printer 30 checks whether the reorder value 52 indicates that a new toner cartridge has already been ordered. If the reorder value 52 indicates that a new toner cartridge has been ordered, the process is terminated (the 'YES' branch of step 104). If the reorder value 52 is configured in a state which indicates that a new toner cartridge has not been ordered (the 'NO' branch of step 104), the orderer 60 is invoked and a new toner cartridge is ordered (step 106).

At step 108, the reorder marker 66 changes the reorder value 52 to indicate that a new toner cartridge has been ordered. As shown, the reorder value 52 is data in the component memory which is initially set to a first value. When the new toner cartridge is ordered, the reorder marker 66 changes the reorder value 52 to a second value. It is noted that the reorder value 52 and the reorder marker 66 may comprise different components in a different arrangement. For example, the reorder value 52 could comprise a fuse and the reorder marker 66 could be configured to blow the fuse when a new toner cartridge is ordered, thereby indicating that the new toner cartridge has been ordered. Any indicator configurable to a first state to indicate that a new toner cartridge has not been ordered, and reconfigurable to a second state to indicate that a new toner cartridge has been ordered may be utilized in this system.

Figure 5:
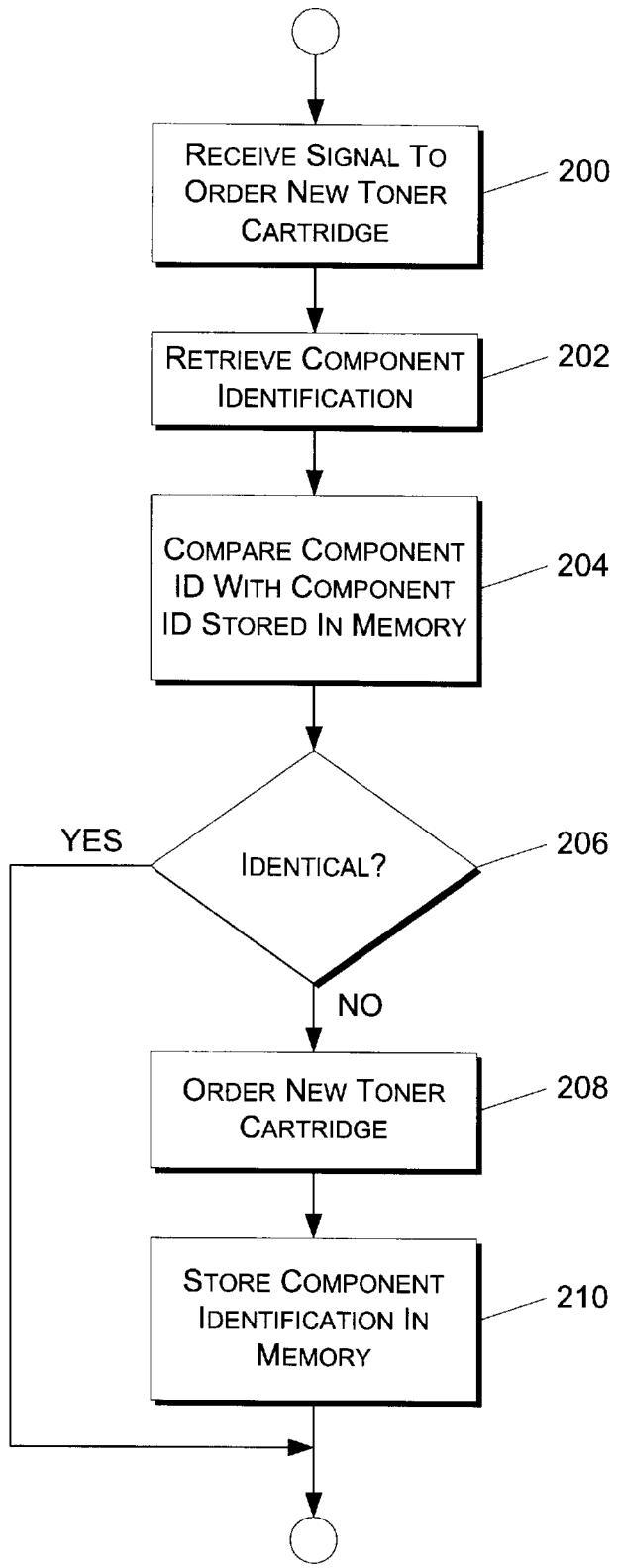
FIG. 5 is a flow diagram of a redundant reorder prevention process for replaceable printer components utilizing a component identification.

FIG. 5 depicts a redundant reorder prevention process that utilizes the component identifier 54 to prevent redundant reorders. At step 200, the status monitor 64 receives the signal to order a new toner cartridge to replace the toner cartridge 32. The printer 30 retrieves the component identifier 54 from the memory tag 36 of the toner cartridge 32. The printer 30 compares the component identifier 54 with entries in the component identifier lookup table 74a in the printer memory 58 (step 202). The component identifier lookup table 74a contains component identifiers from toner cartridges for which replacement cartridges have been ordered in the past. Alternatively, the component identifier lookup table 74a could contain only one entry, that being the component identifier of the previous toner cartridge that was ordered.

For purposes of the present discussion, the component identifier lookup table 74a is shown stored in the printer memory 58. However, it is noted that the component identifier lookup table 74b may be stored in the host computer 68, or that the component identifier lookup table 74c may be stored in the vendor system 70. If the component identifier lookup table 74c is stored in the vendor system 70, then the redundant reorder prevention system would function even if the toner cartridge 32 were to be removed from the printer 30 and installed in another printer (not shown) connected to another host computer (not shown), provided that the same vendor system 70 is contacted each time an order is made.

At step 204, the component identifier 54 is compared with the entries in the component identifier lookup table 74a. If the component identifier 54 is identical to one of the entries in the component identifier lookup table 74a, then the replacement toner cartridge has already been ordered and the order process is terminated ('YES' branch of step 206).

If the component identifier 54 is not identical to an entry in the component identifier lookup table 74a, then the replacement toner cartridge has not been ordered ('NO' branch of step 206). The orderer 60 then places an order for a new toner cartridge to replace the toner cartridge 32 (step 208). At step 210, the component identifier 52 is stored in the component identifier lookup table 74a to indicate that a replacement toner cartridge has already been ordered to replace the toner cartridge 32.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. In a printing device having at least one replaceable component with component memory, a method comprising:
   ordering a new replaceable component to replace a current replaceable component in the printing device; and
   storing a reorder value in the component memory to indicate that the new replaceable component has been ordered.

2. The method recited in claim 1 further comprising:
   retrieving the reorder data prior to ordering the new replaceable component; and
   foregoing subsequent attempts to order the new replaceable component to replace the current replaceable component if the reorder data indicates that the new replaceable component has already been ordered.

3. The method recited in claim 1 further comprising:
   sensing a trigger event indicative of a time to order the new replaceable component; and
   wherein the ordering further comprises automatically ordering the new replaceable component.

4. The method recited in claim 1 wherein the current replaceable component comprises component memory that stores a component identifier, and the storing reorder data further comprises storing the component identifier in memory located within the printing device.

5. The method recited in claim 1 wherein the current replaceable component comprises component memory that stores a component identifier, and the storing reorder data further comprises storing the component identifier in memory located within a host computer connected to the printing device.

6. The method recited in claim 1 wherein the current replaceable component comprises component memory that stores a component identifier, and the storing reorder data comprises storing the component identifier in memory located within a vendor system from which the new replaceable component is ordered.

7. A computer-readable medium having computer-readable instructions thereon which, when executed by a computer, perform the steps of claim 1.

8. A printing system comprising: a printing device;
   a replaceable component installable in the printing device;
   component memory incorporated into the replaceable component;

reorder data stored in the component memory that indicates whether or not a new replaceable component has been ordered to replace the replaceable component; and an orderer configured to order the new replaceable component upon the occurrence of a trigger event if the reorder data indicates that the new replaceable component has not been ordered.

9. The printing system recited in claim 8 wherein the orderer further comprises a reorder marker configured to set the reorder data to indicate that the new replaceable component has been ordered after the orderer orders the new replaceable component.

10. The printing system recited in claim 8 wherein the printing device is a laser printer and the replaceable component is a toner cartridge.

11. The printing system recited in claim 8 wherein the memory is a radio frequency identification (RFID) memory tag.

12. The printing system recited in claim 8 further comprising a component identifier stored in the component memory, and wherein the orderer is further configured to retrieve the component identifier and store the component identifier in memory of the printing device.

13. The printing system recited in claim 8 further comprising:

a host computer connected to the printing device;

a component identifier stored in the component memory; and wherein the orderer is further configured to retrieve the component identifier and store the component identifier in memory of the host computer.

14. The printing system recited in claim 8 further comprising:

a host computer connected to the printing device;

a vendor system from which the new replaceable component is ordered, the vendor system being configured to communicate with the host computer;

a component identifier stored in the component memory: and wherein the orderer is further configured to retrieve the component identifier and store the component identifier in memory of the vendor system.

15. A printer comprising:

a replaceable component having component memory incorporated therewith; and a reorder indicator stored in the component memory, the reorder indicator having a first state to indicate that a new replaceable component has not been ordered, and a second state to indicate that a new replaceable component has been ordered.

16. The printer recited in claim 15 further comprising an orderer configured to order the new replaceable component, the orderer having a reorder marker to configure the reorder indicator to the second state when the new replaceable component is ordered.

17. The printer recited in claim 16 wherein the orderer further comprises:

a status monitor configured to poll the reorder indicator before the orderer orders the new replaceable component;

the orderer being configured to order the new replaceable component upon the occurrence of a trigger event if the status monitor indicates that the reorder indicator is in the first state.

18. A replaceable printer component comprising:

component memory incorporated into the replaceable printer component; and a reorder indicator stored in the component memory having a first state to indicate that a new replaceable printer component has not been ordered, and a second state to indicate that a new replaceable component has been ordered.

* * * * *